United States Patent [19]
Mold

[11] Patent Number: 5,978,772
[45] Date of Patent: Nov. 2, 1999

[54] MERCHANDISE CHECKOUT SYSTEM

[76] Inventor: Jeffrey W. Mold, P.O. Box 1443, Virginia Beach, Va. 23451

[21] Appl. No.: 08/946,653

[22] Filed: Oct. 7, 1997

Related U.S. Application Data

[60] Provisional application No. 60/028,464, Oct. 11, 1996.

[51] Int. Cl.$^6$ .................................................. G06F 17/60
[52] U.S. Cl. .............................. 705/16; 705/20; 705/21; 705/24; 705/27; 235/383; 235/432; 235/462; 186/61
[58] Field of Search .................................... 235/383, 432, 235/462; 186/61; 705/16, 20, 21, 24

[56] References Cited

U.S. PATENT DOCUMENTS

| | | | |
|---|---|---|---|
| 4,675,647 | 6/1987 | Salin et al. .......................... | 340/286.06 |
| 4,850,009 | 7/1989 | Zook et al. .......................... | 379/93.17 |
| 4,859,838 | 8/1989 | Okiharu ................................ | 705/22 |
| 5,029,183 | 7/1991 | Tymes ................................... | 375/206 |
| 5,179,270 | 1/1993 | Taussig et al. ..................... | 235/462.15 |
| 5,245,163 | 9/1993 | Yehuda ................................. | 235/377 |
| 5,272,324 | 12/1993 | Blevins ................................. | 53/64 |
| 5,311,969 | 5/1994 | Dickover et al. .................... | 186/61 |
| 5,386,106 | 1/1995 | Kumar .................................. | 235/380 |
| 5,393,965 | 2/1995 | Bravman et al. .................... | 235/383 |
| 5,424,524 | 6/1995 | Ruppert et al. ...................... | 705/8 |
| 5,448,046 | 9/1995 | Swartz .................................. | 235/432 |
| 5,497,853 | 3/1996 | Collins, Jr. et al. ................. | 186/61 |
| 5,793,861 | 8/1998 | Haigh ................................... | 379/266 |
| 5,804,807 | 9/1998 | Murrah et al. ....................... | 235/383 |

FOREIGN PATENT DOCUMENTS

| | | |
|---|---|---|
| 199252 | 10/1986 | European Pat. Off. . |
| WO 90/16051 | 12/1990 | WIPO . |

*Primary Examiner*—Emanuel Todd Voeltz
*Assistant Examiner*—John W. Hayes
*Attorney, Agent, or Firm*—Richard C. Litman

[57] ABSTRACT

A merchandise checkout system in which a first scanning device is brought into service at peak times to scan the bar codes of checkout items held by waiting customers in a checkout lane. Each first scanning device is preferably a mobile unit linked with a central computer tuned to a single transceiver frequency associated with each lane so that multiple scanning units may be placed into service simultaneously. Purchase information is transmitted both to a tote display screen for review by a customer and to a temporary holding memory of the computer, linked with the computerized cash register of a lane. A specialized bagging cart is described to assist a clerk during scanning. After the checkout items are totalled, a multi-part queue number-total/subtotal slip including a bar code readable by a second scanning device at a cash register component is generated and presented to the waiting purchaser for later presentation to the cashier. The computer memory is capable of storing multiple files of purchase information associated with each lane. The cashier is thereby freed to only scan the queue number-total/subtotal slip to verify and tender the payments of customers serviced by the first scanning device, thereby increasing throughput. The queue number-total/subtotal is retrieved from the customer before payment, whereupon the customer is presented with an enlarged, organized receipt.

10 Claims, 6 Drawing Sheets

TRADENAME STORE #229   "YOUR GROCERY STORE"

BAKERY

| | |
|---|---|
| SINGLE BAGEL | .34E |
| ITALIAN BREAD | .99E |
| SPONGE CAKE | .99E |

MEAT, POULTRY, SEAFOOD

| | |
|---|---|
| LAMB CHOP | 2.70E |
| PERDUE CHICKEN | 1.96E |
| MR TRUKEY FRANKS | .89E |
| FRESH CHICKEN LIVERS | .99E |
| TUNA LOIN LARGE | 15.08E |
| FRESH CHICKEN DRUMST | 4.31E |

DAIRY

| | |
|---|---|
| #FF MILK | 2.49E |
| CABOT CHEESE | 5.99E |
| BREYER PEACH YOGURT | .69E |
| RF JUMBO EGGS | 1.09E |

PRODUCE

| | |
|---|---|
| MUSHROOMS | 2.09E |
| 0.84 LB@2.49/LB | |
| GRN SNAP BEAN | .72E |
| 0.56 LB@1.29/LB | |
| SNO PEAS | 1.16E |
| 0.29 LB@3.99/LB | |
| GRN ZUCCHINI | .48E |
| 0.82 LB@.59/LB | |
| YEL/ONION | .33E |
| 0.67 LB@.49/LB | |
| GREEN BELL | .34E |
| 1@1.00 | |
| TOMATOES | 1.51E |
| 1.17 LB@1.29/LB | |

DELI

| | |
|---|---|
| HARD SALAMI | 2.03E |
| 0.51 LB@3.99/LB | |
| LORRAINE SWISS | 1.97E |
| 0.33 LB@5.99/LB | |

GROCERY

| | |
|---|---|
| CREMETTE SPAGHETTI | .37E |
| 1@3/1.09 | |
| CREMETTE SPAGHETTI | .36E |
| 1@3/1.09 | |
| GATORADE JCE | 2.49E |
| BC SARDINES | .75E |

MAGAZINES, ETC.

| | |
|---|---|
| NEW YORK TIMES | 1.00A |
| CAR & DRIVER | 3.50A |

ITEM COUNT:   28

| | |
|---|---|
| TOTAL TAX | 2.59 |
| TOTAL | 60.13 |
| CASH TENDERED | 100.00 |
| CHANGE | 39.87 |

QUEUE NO.
0017

6/21/96   5:15PM

THANK YOU FOR SHOPPING AT TRADENAME STORE

Fig. 5   74

MERCHANDISE CHECKOUT SYSTEM

CROSS-REFERENCE TO RELATED APPLICATION

This application claims the benefit of U.S. Provisional Patent Application Serial No. 60/028,464, filed Oct. 11, 1996.

BACKGROUND OF THE INVENTION

1. Field of the Invention

The present invention relates to a merchandise checkout system for increasing the speed of throughput at peak customer volume periods and, more particularly, to a system including a computerized cash register station and an interactive portable first scanning device. The first scanning device is brought into service by auxiliary store personnel at peak times to scan the bar codes of goods held for purchase by a waiting customer in a single checkout lane; upon scanning, the purchase information is transmitted to a temporary holding memory linked with the computerized cash register, whereupon a queue slip including a queue bar code (readable by a second scanning device at the cash register) is generated and presented to the waiting purchaser for later presentation to the cashier. The cashier handles his immediate customers in an ordinary manner and subsequently scans only the queue slips of customers serviced by the first scanning device to verify and tender only the payments of these customers, thereby increasing throughput.

2. Description of Prior Art

Every consumer is familiar with the problem and frustration of waiting in line at the checkout counter during store peak volume periods. Most working persons must shop or run errands on a weekend day or late afternoon weekday, thus contributing to the peak volume as well as cutting into needed relaxation time. So, it becomes particularly frustrating to the consumer when lines build up contributing to the waste of the consumer's time.

However, even the fastest checkout clerk is limited by the serial nature of ringing up goods being purchased, and therefore reaches a maximum throughput speed. Therefore, traditionally, the only way to increase volume of throughput was to open another checkout lane. However, this too leads to problems. Customers feel unfairly treated if the last customer is first in the newly opened lane, shopping carts are jostled about, registers must be opened with accounted cash drawers, no additional lanes may be available, and so on. Accordingly, an expedient and flexible means of itemizing a customer's intended purchases for later presentation to a cashier for tendering of payment is proposed herein.

Checkout systems directed at increasing throughput are found in the prior art. Of particular interest is U.S. Pat. No. 5,393,965 issued Feb. 28, 1995, to Bravman et al., which describes a two stage retail checkout system for use during peak customer traffic, in which a customer's purchase is first itemized and totalled by a specially adapted bar-code gun (referred to therein as terminals) and then payment is made at a base cash register. The description referring to Bravman's FIG. 8A and FIG. 9A notes a single payment station operated by a cashier for receiving customers from checkout stations equipped with terminals operated by a different clerk. As antifraud measures, a cart with a bar code is scanned to identify a purchase and a transaction bar code is printed on a sales slip having assorted security-related information identified, including the cart code. The sales slip and purchases are then taken to the payment station. The payment station operator scans the sales slip bar code for cart identification and balance due.

Unlike the present invention, the Bravman patent fails to include a two-part queue slip system wherein the queue slip must be tendered for acceptance of payment, before an itemized sales is provided by the cashier. Such a two-part system provides several advantages later described. Moreover, the Bravman patent further ties the cart code with the sales slip, requiring the specialization of shopping carts. The present invention may be applied as a retrofit device and method for use in preexisting shopping facilities without the need for specialized carts.

U.S. Pat. No. 5,311,969, issued May 17, 1994 to Dickover et al. describes a cashier checkout system with a lane configuration including a first checkout module, having a first bar code scanner and a first conveyor leading from the first scanner to the first bagging area and defining a first lane for customers. A second checkout module, having a second bar code scanner and a second conveyor leading from the second scanner to a second bagging area is positioned as an adjacent second lane. A single cashier station is positioned between both lanes for the purpose of receiving payment only; the scanners are intended for use by customers who may scan simultaneously in each lane, thereby increasing throughput time by freeing the cashier to tender a previous customer payment. Such a system has numerous disadvantages, including reliance on the skill and honor system of scanning by a customer.

Other two stage checkout systems are also known. U.S. Pat. No. 5,179,270, issued Jan. 12, 1993 to Taussig et al. describes a two-stage retail checkout system in which a customer's items are first scanned by a specially adapted bar-code gun which is in direct communication with a separate cash register device by means of an improved internal interface, whereupon the customer moves on to a cash register to complete the transaction. U.S. Pat. No. 4,859,838 issued Aug. 22, 1989, to Okiharu describes a point of sale terminal for reading bar codes which can continue registration processing even if memory units containing price look up files develop trouble.

Portable or individually held bar code scanning devices are also known in the prior art, elements of which may be incorporated into the present invention. For example, each of the following patents, U.S. Pat. No. 5,029,183 issued Jul. 2, 1991, to Tymes; U.S. Pat. No. 5,386,106 issued Jan. 31, 1995, to Kumar; U.S. Pat. No. 4,850,009 issued Jul. 18, 1989, to Zook et al.; Pat. Application No. 199,252 published by the European Patent Office on Oct. 29, 1986; and U.S. Pat. No. 5,448,046 issued Sep. 5, 1995, to Swartz, disclose hand held bar code guns with various combinations of components including a visual display device, a numeric key pad, additional feature buttons, a means to print a preliminary receipt, a means to read a credit card, and external communication means and data downloading means.

In particular, the Kumar patent discloses a hand held bar-code gun which has a visual display, a numeric key pad with additional feature buttons, a magnetic card swipe, the ability to print a receipt, and wireless communication ability with a register. The Kumar patent suggests that such a device furnishes all functions necessary to facilitate a complete a point of sale credit card transaction. This patent, however, fails to teach the use of the gun for increasing throughput in the manner described by the present method, nor in combination with a computerized cash register or a queue ticket having a bar-code for scanning and retrieval of the pre-scanned merchandise. The Zook and Tymes patents describe portable handheld optical bar code readers using a radio frequency transceiver to wirelessly and interactively communicate with a remote computer system. Finally, the Swartz patent describes the use of an optical bar code reader on a field-portable housing on a belt or shoulder strap which communicates with a host computer, which may be a cash register, to provide retail price information which in turn is used to update labelling of inventory. The invention of the European Patent is also an optical reader with a printer directed at labelling. Each of these patents fails to teach a use for increasing throughput in the manner described by the present method, or a combination of readers with both a computerized cash register and a bar code readable queue ticket read by a second scanner at the cash register.

U.S. Pat. No. 5,424,524 issued Jun. 13, 1995 to Ruppert et al. and Publication No. 90/16051 of the World Intellectual Property Organization, dated December 1990, describe the use of personal bar code scanning devices for aiding shoppers to keep track of expenditures and speeding the process of check-out. Although information is first stored by the personal scanning devices and then downloaded to the store computer, the patent fails to teach its use in combination with a queue ticket for speeding the throughput when an existing line of customers is already present.

None of the above inventions and patents, taken either singularly or in combination, is seen to describe the instant invention as claimed. Thus, a merchandise checkout system solving the aforementioned problems is desired.

SUMMARY OF THE INVENTION

The invention is a two-stage retail merchandise checkout system in which a first scanning device is brought into service at peak times to scan the bar codes of goods held for purchase by a waiting customer in a single checkout lane. A first clerk assists by scanning each customer's checkout items with the first scanning device, whereupon the scanned purchase information is transmitted both to an enlarged tote display screen for review by the customer and to a temporary holding memory linked with the computerized cash register.

After the checkout items are totalled, a queue ticket including a bar code readable by a second scanning device at a cash register component is generated, and then presented to the waiting purchaser for later presentation to the cashier. The cashier (a second clerk) handles his immediate customers in a conventional checkout manner and subsequently only scans the queue ticket to verify the balance due of subsequent customers, thereby increasing throughput. The queue ticket is retrieved by the second clerk from the customer before payment, whereupon the customer is presented with an enlarged, categorized receipt.

The specially adapted bar code reading component of this system has a visual display portion such as a liquid crystal display (LCD) screen, a numeric keypad and additional feature buttons, a printing device, and the ability to communicate with a computer means and a cash register component. Additionally, the bar code gun may have a credit card swipe and a checking account number reading swipe. The computer means, which may be housed in a modern checkout cash register, includes a database of the descriptions and prices of all sale items, a temporary holding memory of all information read by the bar-code gun, the ability to retrieve and display the information read by the bar-code gun, the ability to calculate the total cost of checkout items, the ability to print an enlarged receipt, the ability to communicate with the bar-code gun via a wire or transceiver, and the ability to store credit card and checking account numbers of customers for retrieval when payment is tendered.

Accordingly, it is a principal object of the invention to provide a merchandize checkout system employing a cash register component with memory and bar code scanning capabilities and a mobile bar code scanning component selectively brought into temporary use to increase speed of checkout throughput.

It is another object of the invention to provide a merchandize checkout system with memory and bar code scanning capabilities in which the scanning and cashiering functions of the system are temporarily and spatially divided into separately operated components.

It is a further object of the invention to provide a merchandize checkout system having two computer-linked components, each for use by a different operator, whereby at least one group of checkout items of one waiting customer are scanned for bar code information which is then stored in a temporary holding memory for retrieval at a later time by a second cashier station.

Still another object of the invention is to provide a secure two-component system which helps prevent attempts by customers to defraud the retail establishment at checkout.

It is an object of the invention to provide improved elements and arrangements thereof in a merchandise checkout system for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1A is a front perspective view of the tote display in FIG. 1.

FIG. 5 is a diagrammatic representation of the customer purchase receipt showing retrieved customer purchase information.

Similar reference characters denote corresponding features consistently throughout the attached drawings.

DETAILED DESCRIPTION OF THE PREFERRED EMBODIMENTS

Figure 1:
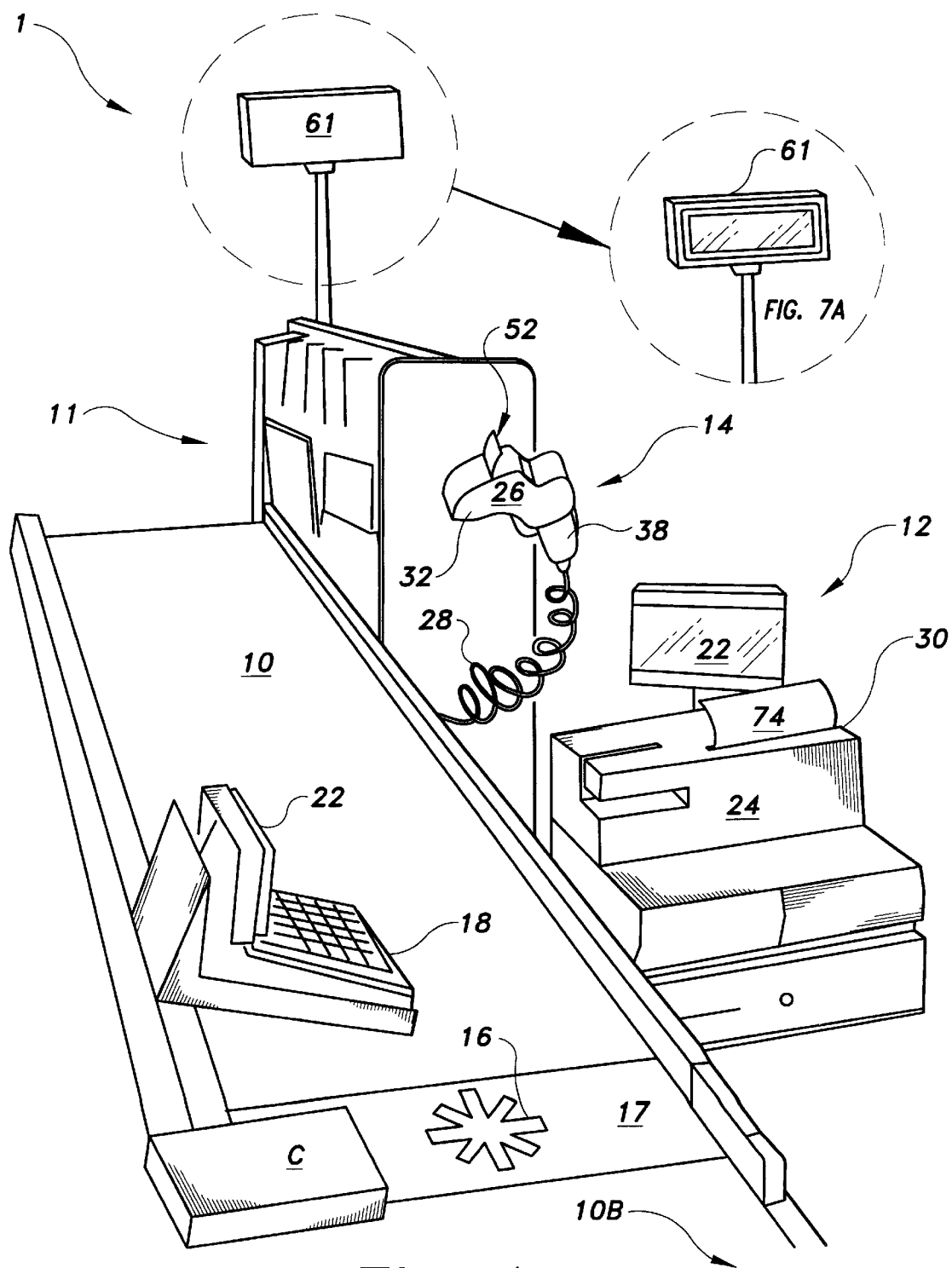
FIG. 1 is an environmental, perspective view representative of the external appearance of a first embodiment of a merchandise checkout system including an enlarged tote display and enlarged receipt for use according to the present invention.

The present invention relates to a merchandise checkout system and method of its use for increasing the speed of throughput particularly at peak customer volume, and more particularly, a system including a computerized cash register station and a portable first scanning device. Referring generally to both FIGS. 1 and 2, the merchandise checkout system 1 includes two spatially separated and specialized components, a cash register component 12 and a portable bar code reading component 14, and a central computer 40 which can be housed within the cash register or made separate. Whereas FIG. 1 shows a possible external appearance of an embodiment of the merchandise checkout system of the present invention, the functional integration of the components 12, 14 may be understood from FIG. 2, wherein they are shown linked by the internal computer 40. The system provides the bar code reading component 14 for use as an auxiliary device for use at peak checkout volume in combination with a permanently positioned cash register component 12, capable of retrieving information stored in the central computer means 40 as inputted by means of the bar code reading component 14.

Referring to FIG. 1, the use of the components 12, 14 in combination with a commonly used checkout lane is shown. A typical checkout counter 10 is shown having a entry end 10a, an impulse rack 11 of merchandise and a bagging end 10b. The cash register component 12 is typically provided at a fixed location, such as the bagging end 10b of the counter 10, to allow the cashier to check out customers in an ordinary manner. The cash register 12 contains a checkout register 24 and printing means 30. A well known type of fixed countertop laser scanner 16, a produce scale 17 and a control panel, keypad or keyboard 18 is positioned nearby. Such well known devices allow the cashier to control the ordinary manner of checkout, through conventionally known checkout functions automatically performed by the scanner or manually input by means of the keys, such as PLU (price look up), overring voiding, register totalling, etc. Moreover, commonly known display screens 22 on the cash register 12 and on the separate keypad 18 are provided for visual review of a checkout item C being scanned.

Figure 2:
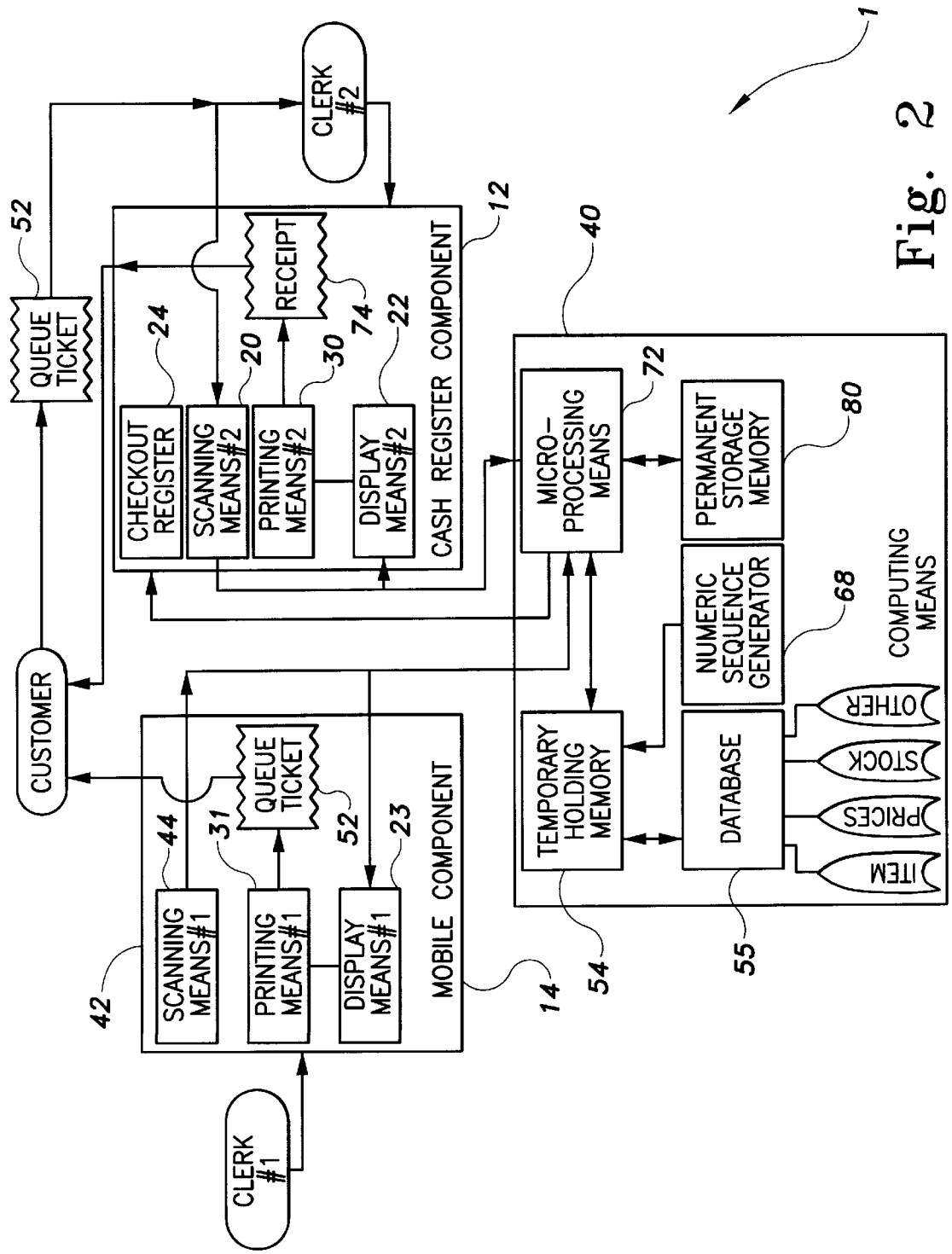
FIG. 2 is a block diagram representative of the flow of information between the necessary components of the preferred embodiment of the merchandise checkout system.

The central computer means 40 can be internally housed by a cash register 12 (FIG. 1), or externally housed from the checkout register 24 as shown by FIG. 2. The computer means 40 is adapted for use according to the present invention by providing a temporary holding memory 54 linked to the bar code reading component 14, thereby allowing a temporal separation between the scanning of the checkout items for storage in a checkout file in the temporary holding memory 54 and the retrieval of the checkout file at tendering of payment at the checkout register 24.

As shown in FIG. 1, the bar code reading component 14 can be used directly at the counter 10 by a first clerk (not shown). The portable bar code reading component 14 includes a hand-held scanner unit 26, shown remotely linked to the computer of the checkout register 24 by a wire 28 and jack (not shown), provided for use at a point proximate to the entry end 10a as dictated to serve a line of customers in accordance with the method of use of the present invention. An appropriate jack can be positioned at any suitable point such that a first clerk might be positioned near the entry end 10a of the counter 10. Alternatively, the portable bar code reading component 14 can be configured to include a second fixed countertop laser scanner 16 (not shown).

As more fully described later, a mobile, preferred embodiment of the bar code reading component 14 is provided, wherein the first clerk may roam independently of the counter and scan checkout items C in a customer's shopping cart in a checkout line inconveniently distant from the counter 10. As later discussed with reference to FIGS. 6 and 7, the preferred mobile embodiment can include a specialized bagging cart 200 which facilitates the scanning process by the first clerk by allowing the clerk to move checkout items from the customer's shopping cart to a bag 204 held by the bagging cart 200, which eliminates the need for a counter 10 onto which the customer must unload a checkout item from the shopping cart. The bags 204 can then be returned to the customer's shopping cart 200 as the first clerk completes the scanning process in anticipation of tendering payment by the customer to the cashier. This procedure confers the added advantage of time savings onto the cashier by eliminating the need to bag checkout items at the bagging end 10b.

Figure 3:
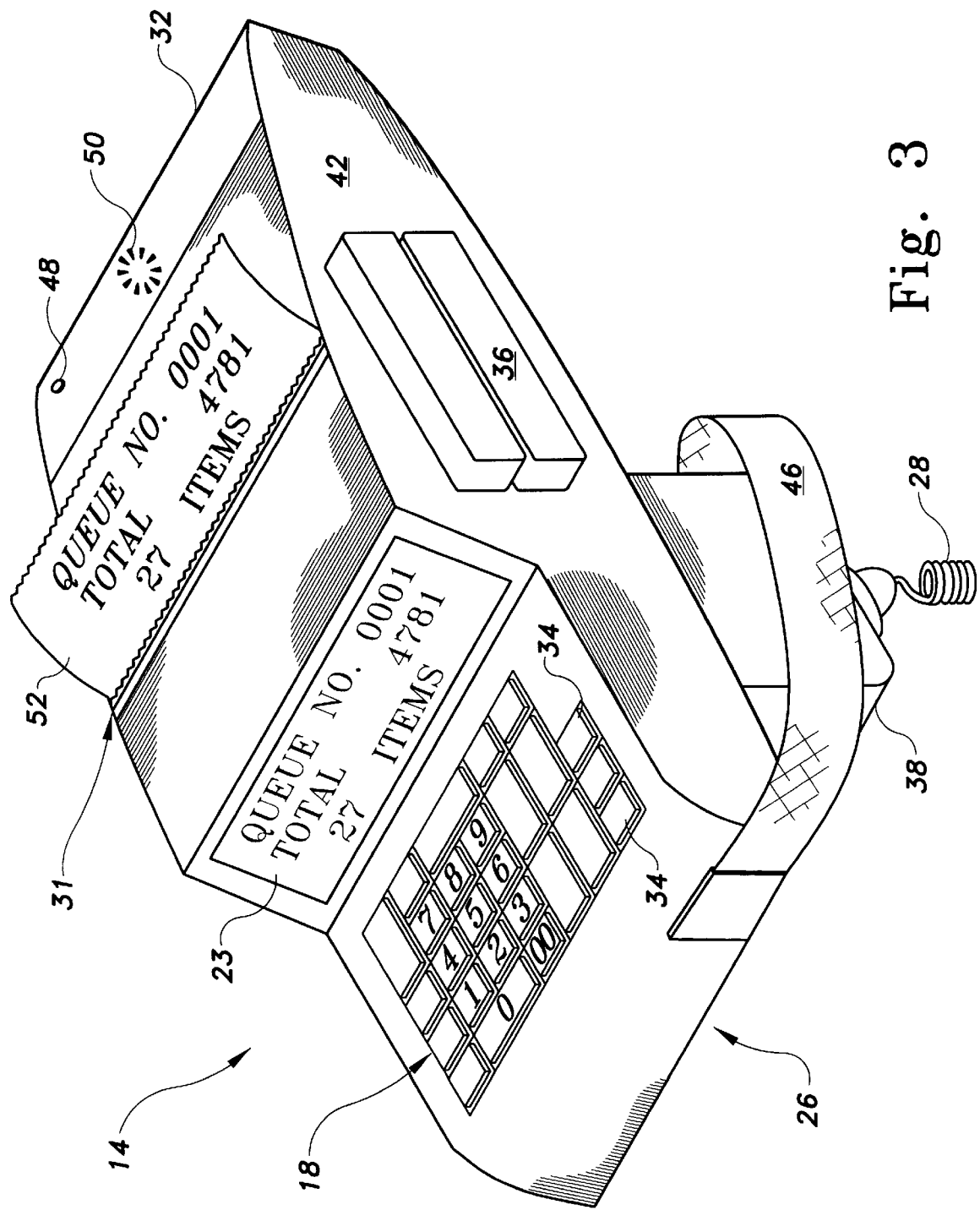
FIG. 3 is a perspective view of preferred embodiment of a hand-held bar code scanner for printing a queue slip and storing customer purchase information.

As shown in greater detail in FIG. 3, the bar code reading component 14 includes a hand-held bar code scanner unit 26, which is provided with a harness belt 46 to be worn by the first clerk. The unit 26 has a scanning end 32 and a pistol-type handle 38, the unit 26 having a mechanism at the scanning end to optically scan a bar code of a checkout item as is well known in the prior art. However, the unit 26 further includes a printing unit 31 which is linked to the computer 40 of the checkout register 24 for printing a queue number-total/subtotal slip 52 having a queue bar code 62 shown in FIG. 4. To provide a completely portable bar code reading component 14, the bar code scanner unit 26 can be linked with a portable multiple-frequency transceiver (not shown) for communication with the central computer means 40. The bar code scanner unit 26 is further provided with a control panel, keypad or keyboard 18 (FIG. 3) for input and control of conventionally known checkout functions, such as a price look up (PLU), an overring voiding, a register totalling, etc. In addition, special feature keys 34 are provided for accomplishing the purposes provided herein and described below. A standard magnetic strip swipe reading unit 36 for reading credit cards and debit cards for electronic funds transfers is also provided.

The details of the components 12, 14, their operation and use may now be understood by example and referring to the flow of the block diagram of FIG. 2. The present system is intended for use during peak volume periods. Therefore, during low customer volume periods the checkout counter 10 is operated solely by the second clerk using solely the cash register component 12, thus generally defining the ordinary manner of checkout. The cash register component 12 is provided with all the components necessary for use by the second clerk in the ordinary manner of checking out customers at a modern cash register, as well as improved features. The usually available features of a modern checkout register 24 include a manual input means, such as the keyboard 18, and a scanning means #2 20 and a display means #2 22. However, it should be understood that, although the ordinary manner of checking out is defined by the lone action of the second clerk during low volume periods, the cash register component 21 is nevertheless provided with a specialized printing means #2 30 capable of printing an oversized, organized receipt 74 (FIG. 5), which the second clerk ultimately presents to the customer. The printing of the receipt is dependent upon programming of the central computer 40.

In contrast to the ordinary checkout manner, at peak volume times the second clerk (cashier) may feel that a line of customers has become too long for expedient throughput of checkout items and customers. For example, if eight customers are in line at the second clerk's checkout counter 10, the second clerk calls a first clerk, usually by means of a paging phone (not shown) provided in most retail stores, to attend the bar code reader component 14, which in FIG. 2 is referred to as a mobile component 14 in accordance with the description of the preferred embodiment. The first clerk then outfits himself with the mobile component 14.

As should be understood from FIG. 2, the elements comprising each of the components 12, 14 can be individually housed or combined in alternative combinations into a one or more single housings. The preferred embodiment (not specifically shown in the Figures, but as modified from that shown in FIG. 3) of the mobile component 14 is configured as a single hand held scanner unit 26 in combination with the remaining features being harnessed to the body of a first clerk so as to lighten the weight of the hand held scanner unit 26. A housing 42 would operably enclose an optical bar code scanner (the unit identified as scanning means #1, 44, in FIG. 2), a liquid crystal display 23 provided for visual review of checkout items (identified as display means #1, 23, in FIG. 2) and an alphanumeric keypad 18 for manual input (as shown in FIG. 3). A light emitting diode 48 and a multi-tone sound generator 50 can be added for the convenience of the clerk so as to avoid repeated use of the display 23 in order to verify that a checkout item has been properly scanned. The unit 26 is further provided with a belt or wrist strap harness 46 as needed for added support, safety and comfort of use. The unit 26 would be linked by wire 28 to a transceiver (not shown) which in turn wirelessly communicates with the computing means 40 (FIG. 2) of the cash register component 12. The transceiver is housed on a belt harness (FIG. 3) for comfortably wearing on the body of the first clerk. Each transceiver is capable of being tuned to one of multiple frequencies which correspond to a different checkout lane, which in turn is transmitted and processed by the computing means 40. Thus, more than one mobile component 14 may be used at one time during volume periods.

As an alternative embodiment, the harness 46 may also support the printer unit 31 (in FIG. 3, and also identified as printing means #1, 31 in FIG. 2) as an independent unit operably linked with both the hand held scanner unit 26 and the transceiver. As a further variation, a swivelling, lockable keypad 18 can be separately housed and supported on the harness belt, for right- or left-handed use. In the preferred embodiment of the hand-held scanner unit 26, the keypad 18 and the liquid crystal display 23 are unitarily housed in a separate housing operably mounted on the housing 42 of the scanner unit 26 such that the keypad/LCD 18, 23 is swivelable from a central longitudinal axis (in contrast to the shown centered position of the keypad 18 and LCD 23 in FIG. 3) to an offset position, at an angle to either the right or the left of the central axis. This feature allows a the unit to be conveniently used by either a right- or left-handed individual. Alternatively, for convenience of use, the scanner unit 26 can be placed within a fixed bracket (not shown) attached to the bagging cart 200 (FIGS. 6 and 7) to allow hand-free scanning.

Having so equipped oneself, the first clerk now chooses a point in the customer line to begin entering checkout items C for storage in a temporary holding memory 54 of the computing means 40 (such process herein named the "itemization function"). In the present example, the first clerk may choose the third customer in line from the point of checkout register, thereby leaving the second clerk to ring up checkout items and accept tender of payment of the first and second customers in a conventional manner while the first clerk proceeds with the itemization function for the subsequent customers in line.

Figure 7:
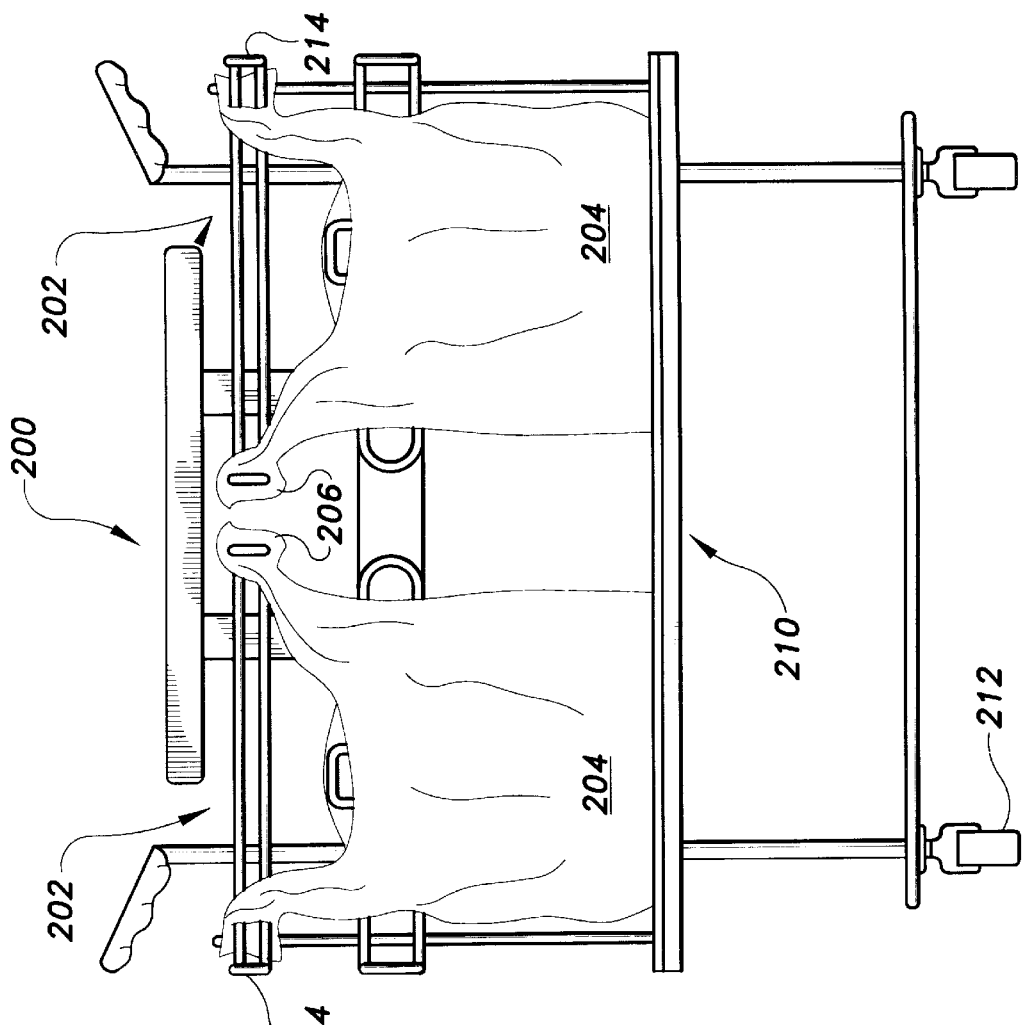
FIG. 7 is a front, elevational view of the specialized bagging cart as shown in FIG. 6.
Figure 6:
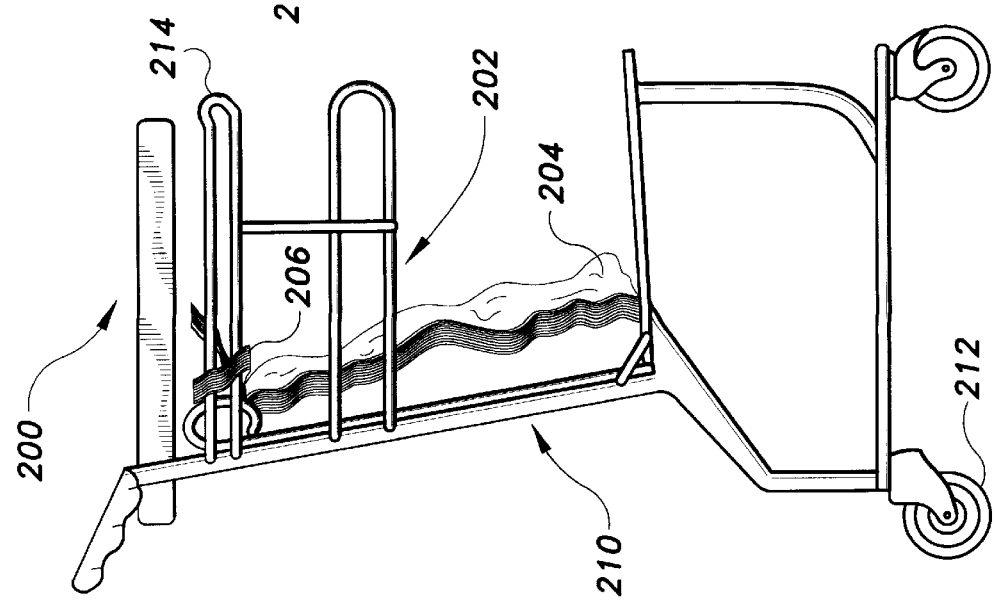
FIG. 6 is a side, elevational view of a specialized bagging cart.

Typically, the third customer is awaiting checkout with a shopping cart full of checkout items. However, as two customers are ahead in line, the third customer may be unable to unload the cart onto the checkout counter. Therefore, during the itemization function, the first clerk is assisted by a specialized bagging cart 200, as shown in FIGS. 6 & 7, which precludes the need for a stationary counter. The bagging cart 200 is provided with a carriage frame 210 to which is mounted a support means 202 for supporting a plurality of bags 204 supplied for bagging of checkout items. The bags 204, as presently favored in grocery stores, are shown as plastic film bags. The support means 202 for such plastic film bags includes an upper support arm 214 from which a pair of loop handles 206 of the bag 204 hang. The bags 204 may be conveniently opened by pulling one of the pair of loop handles 206 forward and exposing the interior of the bag 204, whereby the bag substantially hangs open freely over the length of the support arm 214.

The carriage frame 210 is provided with a plurality of wheels 212 so that the first clerk may wheel the bagging cart 200 from customer to customer as itemization functions are completed. Moreover, the frame 210 may be adapted to support one or more supporting means 202, preferably two as shown in FIG. 7. Alternatively, in lieu of wheels, the carriage frame 210 can be adapted to include rollers which ride on a fixed rail (not shown) which runs along the checkout lane to help maintain the queue order.

The use of the bagging cart 200 allows the first clerk to scan each of the selected customer's checkout items after removing the checkout item from the customer's shopping cart, and then replace the scanned item into one of the opened bags 204. As a bag 204 is filled, the full bag is then returned to the customer's shopping cart. Thus, the first clerk is able to complete the itemization function without the need for the customer to unload the checkout items onto the counter, and performs the double duty as a bagging clerk thereby eliminating the need for the cashier (second clerk) to bag groceries.

However, if the ratio of the speed of the first clerk in performing itemization functions and the speed of the second clerk in receiving tender of payment is less than one (i.e., the second clerk takes less time per customer to finalize checkout than the first clerk can scan checkout items), the time gap between the second clerk and the first clerk will shrink and eventually disappear. If customers remain in line after the gap is closed between the clerks, no throughput efficiency is gained from such point in time and throughput efficiency returns to that of the ordinary manner of checkout. Therefore, in anticipation of closure of such a gap, it is advisable that the first clerk occasionally skip a customer who the second clerk will handle in an ordinary checkout manner, thereby maximizing throughput efficiency. Such skipped customers are not significantly disadvantaged in so far as the waiting time is extended only by the time of tendering of payment of the customer or customers ahead in line. Alternatively, the first clerk can subtotal the customer's purchases and pass the customer on to the second clerk or cashier.

If a third or fourth customer were close enough to the checkout register such that checkout items held by a customer's cart have been unloaded upon a conveyor belt of the checkout counter 10 leading to the checkout register, the first clerk can choose to perform itemization functions from behind the checkout counter (as shown in FIG. 1 by the presence of the wired scanner unit 26).

As part of his itemization function, the first clerk scans each checkout item C having a bar code. In a conventional manner, the computing means 40 is linked to the scanning means 20, 44 to retrieve from a database 55 the appropriate retail information for each of the checkout items as shown in FIG. 2. The database 55 can include standard item description 51 and item price 53 information, inventory or stock amount 57, and other information as desired to be entered into the database. If necessary, the key pad 18 of the hand held scanner unit 26 allows the first clerk to enter a description or other retail information of unscannable items to allow itemization of such item (such as by an "addition" special feature key 34), or to void unwanted items (by a "void" special feature key 34). During scanning, the customer may review the scanned items on the tote display screen 61, as shown in rear view in the overall view of FIG. 1 and as shown in front view in the inset of FIG. 1A.

Being operably linked to the computing means 40, the tote display screen 61 is an oversized screen which displays the retail information regarding the checkout items, and preferably the description and price of an item, which may be programmed into the computing means 40. In the preferred embodiment, the tote screen 61 is prominently located for viewing from multiple positions in the customer line, and has an enlarged screen for display of at least two, four or five checkout items which remain displayed so long as the screen is not completely filled. The screen may also display the customer's queue number 60 in FIG. 4 to be discussed below. Unlike present cash register screens, the customer is provided with an opportunity to view the screen at an occasional glance without fear of missing an item being presently scanned which otherwise disappears upon scanning of the next item. This may be accomplished by programming the computer means to clear the tote display screen 61 only after the retail information of a predetermined number of checkout items appear on the screen and a further checkout item is entered into the computer means 40.

Figure 4:
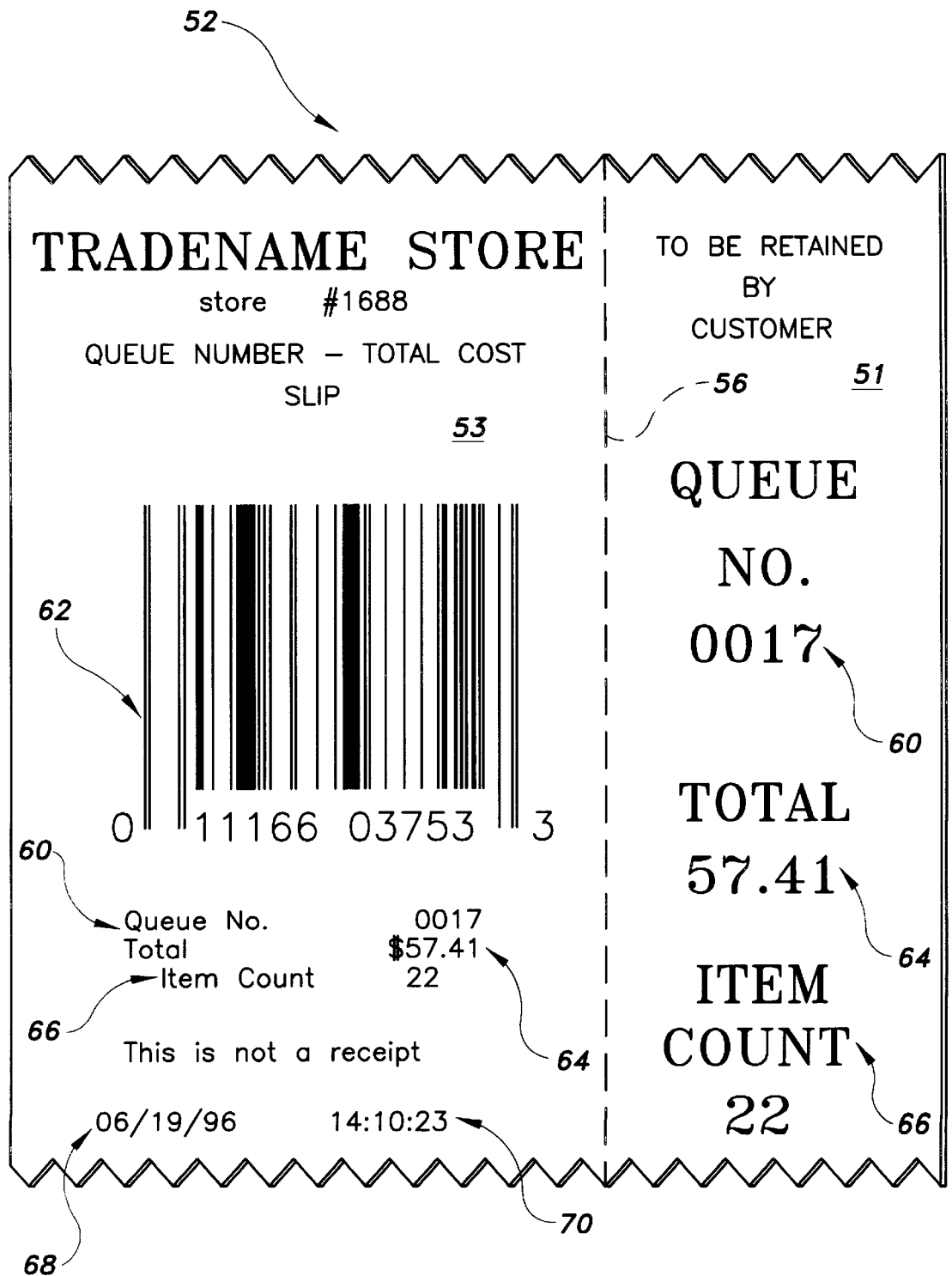
FIG. 4 is a diagrammatic representation of the queue slip showing the bar code necessary for customer purchase information retrieval.

Upon entering all of the checkout items of the third customer, the first clerk inputs a "save" command. This command may be automatically performed by the "total" key on the numeric keypad 18, or by a feature key 34 shown in FIG. 3 (as shown in FIG. 3), which commands the computer means 40 to perform the following functions: (1) calculate a total of the items counted 66 and the checkout items' prices (64 in FIG. 4); (2) save such total along with the retail information in a checkout file of the temporary holding memory 54 (FIG. 2); and (3) assign such checkout file its own individual queue number 60 (FIG. 4). The computing means 40 (FIG. 2) is provided with a numeric sequence generator 68 (FIG. 4) which generates a sequential series of numbers, wherein each number corresponds with each sequentially created checkout file. A microprocessing means 72 (FIG. 2) is further provided with a comparator or other means programmed to first retrieve the numeric sequence of queue numbers 60 (FIG. 4) generated by the numeric sequence generator 68 and then include it as part of the queue number-total/subtotal slip 52 and queue bar code 62. For discussion purposes in the present example, the queue number may be "#00001" for the third customer, #00002 for the fourth customer, and so on, although the queue number 60 is arbitrarily designated as "0017" on the queue number-total/subtotal slip 52 in FIG. 4.

The printing means #1 31 (FIG. 1) for printing a queue number-total/subtotal slip 52, then can automatically generate a printout upon a paper slip, which forms the queue number-total/subtotal slip 52 which is presented to the customer for later presentation to the second clerk. The reason for naming slip 52 as being in addition a subtotal slip is because the customer can still add items such as from the impulse rack 11, etc. to one's order before payment is tendered and the final enlarged receipt 74 (FIG. 5) is presented. Another instance for subtotalling a customer's order by the first clerk is when the second clerk or cashier has no customer waiting, in order to pass this customer on to the second clerk for completing the itemization of the purchases.

As shown in FIG. 4, the queue number-total/subtotal slip 52 comprises a retainable portion or standard item description 51 and a presentable portion or item price information 53 separated by a series of perforations 56 which allow the queue number-total or subtotal slip 52 to be separable into two parts.

The presentable portion 53 is presented to the second clerk for scanning and includes at least the queue bar code 62, human readable, queue number characters 60 and the balance due 64 for the checkout items. In addition, the computer means 40 can be programmed to process other relevant information, particularly including the number of checkout items or item count 66 in the checkout file, and the date 68 and the time 70 of the checkout file, which is also saved in the checkout file. This information may be particularly useful to the second clerk in initially visually assessing as an antifraud measure whether the information on the queue slip appears to correspond with the checkout items presented by the customer.

The retainable portion 51 includes at a minimum the human readable queue number 60 and the total price 64. The retainable portion 51 is kept by the customer to allow the customer to compare his total and queue number as printed on the retainable portion 51 with those retrieved by the computer. The customer thus verifies that no inadvertent payment of another customer's purchase due to second clerk or computer error occurs. This tangible reference is important, since the consumer may forget certain information between the period that the total disappears on the tote display screen 61 (FIG. 1) and payment is tendered to the cashier. Moreover, the queue number 60 on the retainable portion 51 can be compared with the queue number on the final oversized receipt 74 in FIG. 5 as a further assurance that the appropriate payment was tendered.

After delivery of the queue number-total/subtotal slip 52 by the first clerk to the customer, the first clerk passes up the line from customer to customer preparing a queue slip for each customer in a similar manner. The third customer may meanwhile choose to use the queue slip balance due 64 (FIG. 4) to prepare payment of a personal check or other payment means in that amount in any remaining waiting time before tendering of payment to the second clerk.

When the third customer approaches the checkout register 24 after the second customer has been checked out, the third customer hands the presentable portion 53 of the queue number-total/subtotal slip 52 to the second clerk. The second clerk scans the queue bar code 62 of the queue slip #00001 with the checkout register optical scanner (identified as scanning means #2 20 in FIG. 2), which as noted may be a standard fixed countertop unit 16 (FIG. 1) or a hand held unit. The queue bar code 62 is translated by a microprocessing means 72 of the computing means 40, which then retrieves the checkout file (#00001) and displays the retail information on a display screen 22 (FIG. 1) for review by the second clerk or cashier and the customer and printed by printing means #2 30 (FIG. 2).

It should be noted that this display screen 22 should be large enough to allow the review at a glance of all or most of the customer's selections and queue number.

If the customer wishes to add a checkout item from the impulse rack 11, the second clerk may make the appropriate changes by virtue of input means provided by the checkout register 24. Special feature keys 34 (FIG. 3) and reminder display messages may be provided for such use, such as addition or deletion keys as previously described for the hand-held scanner unit 26.

Thus, for the third customer at this point in the process, payment remains to be tendered by the third customer and a receipt to be tendered in return by the second clerk. As can be appreciated from FIG. 5, a receipt 74 (FIGS. 1, 2 and 5), prepared by the second clerk, may be printed on enlarged printer paper to accommodate categorization of each checkout item pursuant to a predetermined organization method. One such method may be to group each item under conventionally accepted categories of retail goods for a given type of retail store, such as bakery, dairy, deli, grocery, meat, poultry, seafood, produce, magazines, miscellaneous, etc. in the case of a grocery store. Obviously, department stores may use such categories as men's wear, ladies' wear, misses wear, lawn and garden, appliances, housewares, and so on. Each category is alphabetized and formatted on the paper in alphabetical order. Checkout items then appear below each category heading, which may also be arranged alphabetically. The computer means 40 is appropriately programmed to present such a format. As may be desired for accounting purposes, the computer means may be programmed to be save the total in a permanent file and assigned a retrievable number so that, when the sale total is entered, a permanent checkout file is created in a permanent storage memory.

As can now be appreciated, as the second clerk checked out the first and second customers in the traditional manner, the first clerk by passing up the line from customer to customer and preparing a queue slip for each customer thereby eliminated the need for the second clerk to perform itemization of each checkout item of the third and subsequent customers. In this manner, each customer serviced by the first clerk saves throughput time by having the checkout items bagged as well as totalled and itemized on the queue slip while waiting for the first and second customers to be checked out by the second clerk. The second clerk need only accept tender from the subsequent customers serviced by the first clerk.

However, in addition thereto, by having the second clerk retrieve the queue number-total/subtotal slip 52 and prepare an itemized receipt 74 for the customer to finalize the transaction, the customer is prevented from using the slip 52 at a later time without alerting the clerk to the fact that the slip 52 is out of sequence. The computing means 40 is also provided with microprocessing means 72 for comparison of the queue number 60 with the numeric sequence. These means allow the queue slip to be used to not only overcome the disadvantages of the antifraud measures as discussed in the Bravman et al. patent as noted above, but also to eliminate the need for a special cart code.

For example, if customer with queue slip #00004 exits the customer line, and returns at a later time, the intervening queue slip numbers beginning with #00005 will have been processed in the meantime. The microprocessing means 72 is provided with a comparator programmed to first retrieve the numeric sequence of queue numbers generated by the numeric sequence generator 68 and then identify a correlating sequence of queue numbers from each queue bar code scanned by the second scanning means 20 which is stored in a permanent storage memory 80 (FIG. 2). Upon each scanning of a queue bar code 62 (FIG. 4), the numeric sequence and correlating sequence are then compared to establish whether the queue number 60 of the bar code of the queue slip 52 presented is sequentially presented at the cash register component 12. "Sequentially presented" is defined to mean that the queue number follows any previous queue number of the correlating sequence. If not sequentially presented, the queue number is identified as a rejected queue number which generates a command to not retrieve the corresponding checkout file in the temporary holding memory 54, and instead generate a rejection message. This rejection message appears in the display means #2 22 of the checkout register 24 (FIG. 1) to alert the second clerk that the customer has returned the customer line after an absence. In the present example, the #00004 queue number would be recognized as a non-sequential entry after the #00005 (or greater) queue number, and would be rejected. A visual message would appear in the checkout register display 22 to alert the second clerk immediately upon scanning the queue bar code 62 (FIG. 4). Similarly, to prevent the later reuse of a queue number-total/subtotal slip 52, the computer 40 may be programmed to compare the date and time against the queue number issued on a given day.

In the preferred embodiment and method, the second clerk must then reitemize each checkout item and be checked out in the conventional manner at the cash register component, thereby reinitiating an entirely new checkout file. However, the computer means 40 can be programmed to provide an override function entered by the second clerk by an appropriate input, e.g., through the special feature key 34 (as in FIG. 3) of the checkout register 24, in which the reitemization is compared with the existing checkout file.

It is to be understood that the present invention is not limited to the embodiments described above, but encompasses any and all embodiments within the scope of the following claims.

I claim:

1. A merchandise checkout system for use with a sales item bearing a bar code containing retail information, wherein a plurality of sales items chosen for purchase is defined as checkout items, the system comprising:

a portable bar code reading component for use by a first clerk at a first mobile location, including:
      a first scanning means for optically reading the bar code;
      a first display means for displaying alphanumeric characters;
      a first input means for inputting retail information to complete an itemization of the checkout items, including an alphanumeric keypad with arithemetic functions for manual entry of input means including a pricw lookup key means, a save compound key means, an i put addition key means, an overring voiding key means, a register totalling key means, a delete input key means, and a final transaction key means; and
      a first printing means for generating a printed queue slip;

a printed queue slip comprising a first part and a detachable second part printed by the first printing means for delivery to a customer, having thereon a queue bar code, a queue number, a balance due of the checkout items and an item count listed in the first part and a queue number, and item count and a balance due of the checkout items listed in the second detachable part;

a cash register component for use by a second clerk at a second location, having:
      a second scanning means for selectively and optically reading the queue bar code and the bar code of each checkout item;

a second printing means for generating a printed sales receipt;

a second display means for displaying alphaaaaanumeric characters; and a second input means and a third display means for inputting retail information to complete an itemization of the checkout items, including an alphanumeric keypad with arithemetic functions for manual entry of input means including a price lookup key means, a save command key means, an input addition key means, a delete input key means, and a final transaction key means;

a computing means for translating the bar code operably linked by a communication means to the bar code reading component and the cash register component, the computing means at least having:

a database containing retail information for each sales item, the retail information at least including an item description and an item price for each sales item;

a numeric sequence generator for generating a numeric sequence corresponding to a sequential order of each queue slip determined by the order iu which the queue slip is generated by the first printing means, and for assigning each queue slip with a queue number corresponding to its position in teh numeric sequence;

a temporary holding memory for receiving and temporarily storing retail information and the queue number, which when the save command is entered defines in the temporary holding memory a checkout file; and a microprocessing means further comprising:

means for retrieving the retail information from the database and translating it into the temporary holding memory in response to detection of the bar code by one of the first scanning means, the second scanning means, the first input means, and the second input means;

means for generating the queue bar code from the retail information and the queue number held in the checkout file;

means for comparing the queue number of each queue bar code scanned by the second scanning means with the numeric sequence to establish a correlating sequence of queue numbers sequentially presented at the cash register component;

means for processing totals of the item prices of the checkout items; and a permanent storage memory for storage of a final transaction file.

2. The merchandise checkout system as defined in claim 1, further comprising a tote display means for displaying the retail information regarding the checkout items consisting of a description of each purchase item and its price, and operably linked to the computing means.

3. The merchandise checkout system as defined in claim 2, wherein the computing means is further provided with means to clear the tote display means only after the retail information of at least two checkout items has been displayed for a predetermined number of seconds.

4. The merchandise checkout system as defined in claim 2, wherein the tote display means is an enlarged screen for display of retail information of at least four checkout items which remain displayed so long as the screen is not completely filled and a further checkout item is entered into the computing means.

5. The merchandise checkout system as defined in claim 1, wherein the first scanning means further comprises a magnetic strip reading means for electronic fund transfers.

6. The merchandise checkout system as defined in claim 1, wherein the bar code reading component is configured to have a portable housing, wherein at least the first scanning means, the first printing means, the first display means and the first inputting means are disposed in the housing.

7. The merchandise checkout system as defined in claim 6, wherein the communications means of the computer means includes a first transceiver for wireless telecommunications in the bar code reading component, and a second transceiver for wireless telecommunications in the computer means.

8. The merchandise checkout system as defined in claim 7, wherein the bar code reading component is provided with a harness belt and housing worn by the first clerk for support of the first transceiver.

9. The merchandise checkout system as defined in claim 1, wherein the computer means is housed in the cash register component.

10. The merchandise checkout system as defined in claim 1, wherein the final transaction file comprises customer information including electronic funds transfer information and checkout files.

* * * * *